MAGNETIC CORE SWITCHING DEVICES

Original Filed Jan. 27, 1958 5 Sheets-Sheet 1

INVENTOR.

BY [signature]
Att.

MAGNETIC CORE SWITCHING DEVICES

Original Filed Jan. 27, 1958

5 Sheets-Sheet 2

INVENTOR.

BY Theodore Haefner
atty

INVENTOR.

BY Theodore Haefner
atty.

INVENTOR.

BY Theodore Haegne [signature]
atty

MAGNETIC CORE SWITCHING DEVICES

Original Filed Jan. 27, 1958 5 Sheets-Sheet 5

INVENTOR.

BY Theodore [signature]
Atty

United States Patent Office 3,256,445

Patented June 14, 1966

3,256,445

MAGNETIC CORE SWITCHING DEVICES

Francois Henri Raymond, St.-Germain-en-Laye, Andre Michel Richard, Paris, Alice Maria Recoque, Sartrouville, and Claude Marie Edmond Masson, Paris, France, assignors to Societe d'Electronique et d'Automatisme, Courbevoie, Seine, France

Continuation of application Ser. No. 711,448, Jan. 27, 1958. This application Apr. 22, 1964, Ser. No. 363,061

4 Claims. (Cl. 307—88)

This invention is a continuation of application Serial No. 711,448, filed January 27, 1958, and now abandoned.

The present invention relates to circuits including saturable magnetic cores for controlling the selctive routing of current pulses to a plurality of distinct load channels.

More particularly, the invention relates to selective routing circuits for current pulses which may serve for controlling the read-out and write-in operations of binary data stores consisting of matrices of bistable magnetic cores, each of which has a substantially rectangular hysteresis loop. In this connection, the invention relates to the selective routing of selection current pulses to lines, rows, or columns of storage matrices, including serially connected control windings for the bistable magnetic cores.

A saturable magnetic core, maintained in a state of magnetic saturation, offers practically no resistance to the passage of an electrical current through an output winding associated with the core. When such a core is free to change its magnetic condition from one state of saturation to another under the control of the ampere-turns due to an electrical current, the value of the current in actual practice is maintained at a restricted and substantially constant level during the entire time interval during which the magnetic condition of the core changes. The higher the number of turns of the control winding, the lower the value of that constant current level.

An object of this invention is to provide magnetic core switching circuits for magnetic cores which use these properties to their best advantage in construction as well as operation.

A further object of the invention is to provide switching circuit arrangements in which certain drawbacks such as noise and parasitic currents occurring in the application of these properties are substantially eliminated.

According to the invention, a magnetic core switching circuit for the selective routing of current pulses to a plurality of separate load channels includes a plurality of at least partially separate channels for routing current from a common current input to a plurality of current outputs. The number of outputs corresponds to the number of loads, a predetermined number of which are to be supplied at each application of a current to the common input. Each of these routing channels contains at least one output winding of a saturable magnetic core, the core including at least one control winding which selectively inhibits or enables the magnetic saturation condition of the core to be altered during each routing period of the device by the current applied to the common input and passing through the output winding connected thereto.

These and other objects of the invention will be more fully apparent from the accompanying drawings, wherein:

FIGS. 1 and 2 show two kinds of magnetic core characteristics which may be used in the switching devices according to the invention;

FIGS. 3 and 4, respectively, show two elementary forms of the invention;

Figure 1:
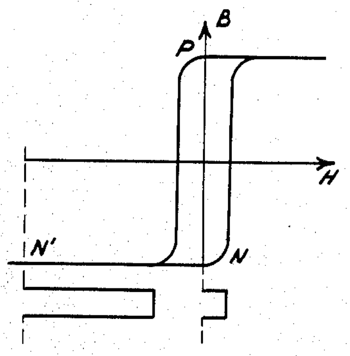

In the drawings, which show both a switching circuit according to the invention and a storage matrix of cores controlled thereby, the interconnections are illustrated as being galvanic. In certain cases, however, it will be advisable to insert in these connections current amplifiers, e.g. magnetic amplifiers, and this can be done without substantially changing the described conditions and without departing from the scope of the invention.

Figure 2:
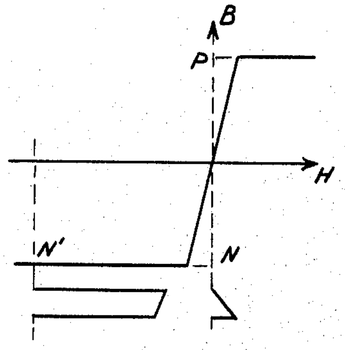

FIG. 1 shows a hysteresis cycle or loop of substantially rectangular shape for a material, for example, of the type known as "ferrites." The graph plots the magnetic induction against the magnetic field. A magnetic core made of such a hysteresis material has two stable states corresponding to the negative and positive remanent induction conditions, N and P. FIG. 2 shows an induction against magnetic field curve for a non-hysteresis material. Both types of material may be used as the saturable magnetic cores in the switching arrangements according to the invention, in which a selection control current is required to maintain a selected core in an unchangeable state of magnetic saturation during the passage of the current pulses for each operation of the device. It may be considered that such control is ensured by a current bringing and maintaining a selected core at a magnetic condition corresponding to N' and beyond N. In such a condition of magnetic saturation, a winding of the core presents a practically negligible impedance to a current passing therethrough. On the other hand, when a core is left at its remanent or N condition, the passage of a suitably directed current through a winding thereof will produce a change of magnetic condition bringing it toward an opposite magnetic stage as indicated at P. During the entire time interval of this change-over of magnetic conditions, the current through that winding is strictly limited to a definite small value.

Figure 3:
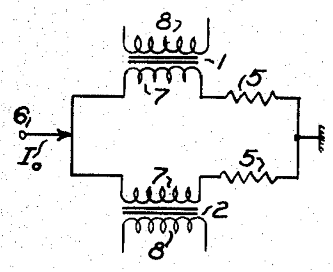

Referring to the diagram of FIG. 3, the switch includes a pair of cores 1 and 2. Each of the cores includes an output winding 7, one end of which is supplied with a current $I_0$ from a common input terminal 6, the other end being connected through a fixed resistor 5 to ground. Both cores 1 and 2 and their output windings 7 are identical, as are resistors 5. Each core is further provided with a selection control winding 8 to control the saturation state of the core.

When the winding 8 of core 1 receives a current sufficient to saturate core 1 at magnetic point N′, while core 2 is left at point N, and when a current pulse $I_0$ is applied to input 6, this current pulse meets a substantially zero impedance in winding 7 of core 1, and consequently the greater part of current $I_0$ will pass through this winding. At the same time, core 2 will be actuated by current $I_0$ to change its magnetic conditions from N to P, and the current through resistance 5 serially connected with winding 7 of core 2 will be maintained at a restricted value $i_c/n$, where $n$ is the number of turns of the winding 7 and $i_c$ the coercive current of the material of the core. The operation is reversed for a reversal of states of the two magnetic cores.

The operation above described can be readily obtained provided that the change of magnetic flux impressed on the saturated core (which is measured by the product of the potential difference across the resistor 5 connected therewith and the time interval of application of the current at terminal 6) is less than or equal to the entire flux absorbed by the core which changes its magnetic condition. If this provision is not met, and if the core which is free to have its magnetic condition modified has actually changed that magnetic condition, the current $I_0$ will be equally distributed between the two conducting paths, and the intended operation of the switch will not be achieved.

The switch may be extended at will by duplicating the number of channels. Its initial condition is preferably defined by placing or maintaining all of the cores at a definite condition, for example at their N magnetic condition. The means for accomplishing this function will be explained further below.

Figure 4:
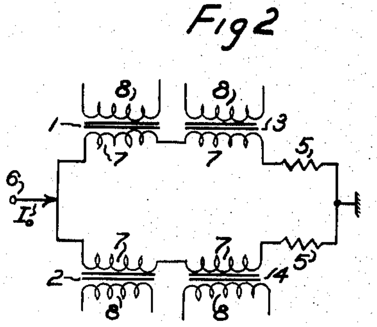

Each channel may comprise several windings such as shown at 7, connected in series. FIG. 4, for example, shows a two channel switch wherein each channel includes a pair of windings 7 of separate magnetic cores 1 and 3 in one channel, and cores 2 and 4 in the other channel. When at least one of the cores in a channel is left free to change its magnetic condition, the current through that channel is of the above-mentioned lower value. When both cores of a channel are saturated at N′, the current flow through the channel will be of the higher value and suitable for actuation of the load concerned. Common current input 6 may be connected through as many parallel channels required for the number of loads. If, for each routing operation of the circuit, a constant number of channels (frequently only one channel) is selected, the value of the current to the selected load will remain the same for a constant input current $I_0$.

Figure 5:
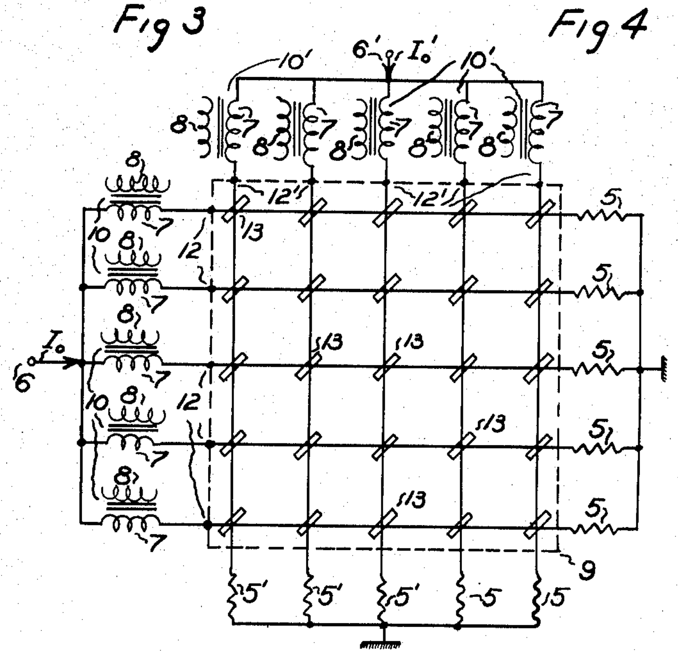
FIG. 5 shows a pair of switching circuits according to the invention applied to the selection of digital positions in a magnetic core storage matrix.

FIG. 5 illustrates the use of a switch according to the invention for controlling the selection of magnetic cores within a conventional storage matrix. In such a matrix, each bit of information is stored in a separate magnetic core 13, and each core has a substantially rectangular hysteresis loop (as shown in FIG. 1) whereby, depending upon its remanent magnetic condition, the core provides a permanent store of a binary "one" or "zero." The matrix is arranged in rows 12 and transverse columns 12′, the cores of the matrix being indicated at 13. Rows 12 in FIG. 5 are connected in parallel to a first routing switch, of the type described, including magnetic cores 10. Columns 12′ are similarly inserted in a second routing switch, the magnetic cores of which are shown at 10′. The control windings 7 and 8 correspond to their identically numbered counterparts in FIG. 3.

In the first switch, a first control current through a selected control winding 8 saturates one of magnetic cores 10 in its N′ condition while a second control current produces the same effect at one of current controlling cores 10′ through its respective winding 8. All of the other cores 10 and 10′ are left free in their remanent N conditions. Thereafter, when a pair of current pulses $I_0$ and $I_0'$ are applied respectively at terminals 6 and 6′, a single row 12 and a single column 12′ (corresponding to the saturated cores 10 and 10′), will be selected by the switches. Consequently, a single magnetic core 13 located at the crossing point of that row and column, will be acted upon by both currents $I_0$ and $I_0'$ and thus selected in the matrix. For a predetermined direction of these currents, the information bit in core 13 will be read-out. For a reverse condition, a write-in operation of a bit of informtion would occur on the selected core 13. The read-out and write-in windings (signal windings) are not shown in the matrix since they may be conventional.

The values of resistors 5 and 5′ terminating the rows and columns, which need not be equal in number, are calibrated in accordance with the number of windings in the respective lines, as well as the values of the currents $I_0$ and $I_0'$ applied to the switches for the selection control of the storage matrix.

The arrangement of FIG. 5 does not require, as far as the matrix is concerned, any of the selection currents to be accurately calibrated to produce at each core 13 one-half of the intensity of a magnetic selection field. The address of the selected core should be previously decoded from its numerical address code number in the computer wherein the matrix is to be used. A digital address code, however, can be decoded in a switching circuit including several series magnetic core windings in any of the routing channels as apparent from the elementary embodiment of FIG. 4. When the loads consist of the storage cores of a matrix, the arrangement shown in FIG. 6 can be used to advantage. The invention is also useful with three dimensional storage matrices of magnetic cores used in the selection of a complete number-word stored therein.

Figure 6:
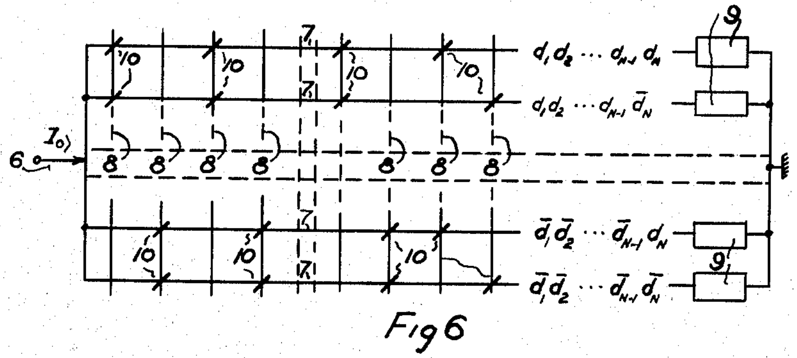
FIG. 6 shows an alternative form of a switching circuit according to the invention including means for decoding the address of a matrix store.

To decode a binary numerical address, it is conventional to use the digital value representations both in their direct and complementary forms $d$ and $\bar{d}$, respectively. A current routing circuit according to this embodiment of the invention includes the same number of magnetic cores in each of its channels and, as shown in FIG. 6, consists of a routing matrix of magnetic cores with $n$ direct or complementary cores 10 per row and $2^n$ rows (when all the numerical codes of the $n$ digits are to be used in the switching circuit). The routing matrix has $2n$ columns, each column being series connected through the windings 8 of direct or complementary cores 10, whereby the suitable application of a binary address, and its complement, to the pairs of column windings will set only one row of cores 10 to its low impedance state. Since each of the rows is coupled through a series connection of the windings 7 of the illustrated cores 10 in that row, after an address has been set in the switch, a single line of windings 7 will pass the current $I_0$ applied to input terminal 6. In any row other than the selected one (in which all of the cores are in the N′ conditions) at least one core will change its magnetic condition to produce a high impedance in those rows. The operation of FIG. 6 is apparent from what has been stated with respect to FIGS. 3 to 5.

Figure 7:
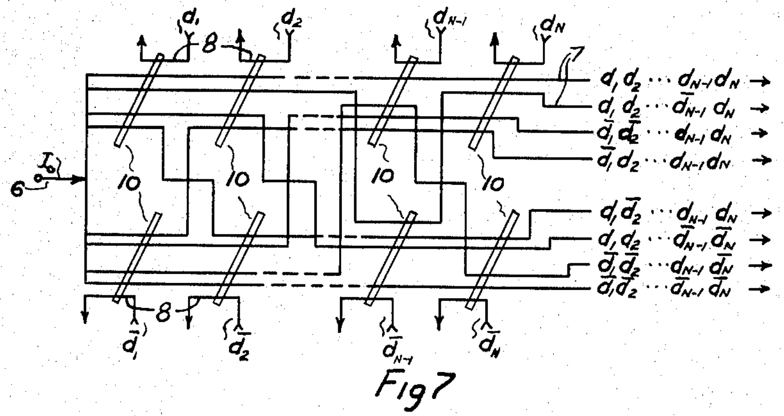
FIGS. 7 and 8 show two alternative embodiments of the circiut shown in FIG. 6.

All cores controlled from one column of windings 8 are controlled simultaneously, and it is possible to substitute for each set of magnetic cores of a column, a single magnetic core provided with $2^{n-1}$ windings of the type represented by windings 7. A construction of this nature is illustrated in the embodiment to FIG. 7.

Figure 8:
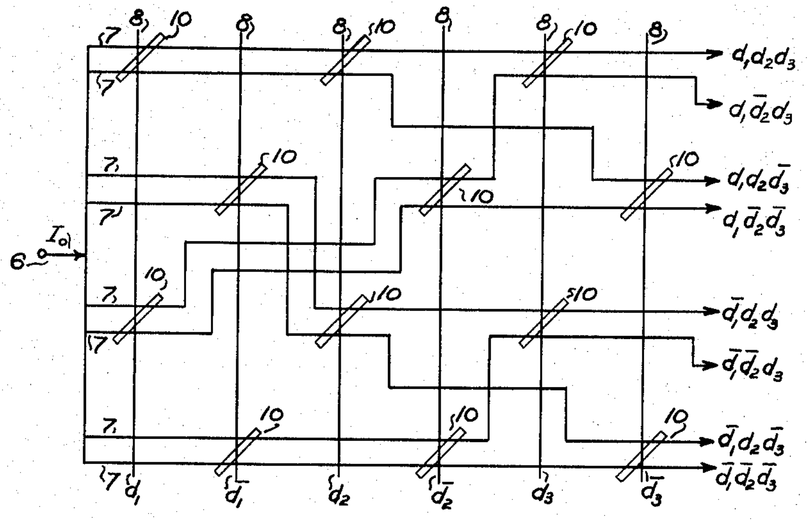

In case it is found difficult in practice to wind $2^{n-1}$ windings on a single core (usually of toroid shape), a smaller even number of cores, for instance two or four, may be used per column of the switching matrix. This will appreciably reduce the total number of required magnetic cores. By way of illustration, FIG. 8 shows a circuit diagram of an arrangement using two cores 10 per column in a three-digit controlled routing matrix.

Figure 9:
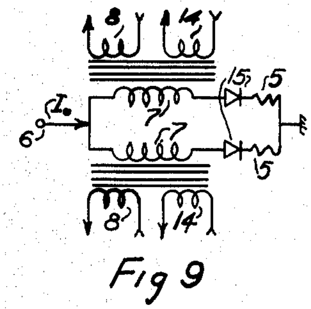
FIG. 9 shows a circuit similar to FIG. 2, wherein stray currents of a certain nature are cancelled.

As previously stated, it is useful and always preferable to provide a definite reset condition for all cores of a switch according to the invention, because for each operation of the switch, most of the cores switch magnetic conditions. In the embodiments disclosed above, when the magnetic cores of the switch are bistable (as in FIG. 1), after routing a current to a load, most of the cores of the matrix are left in a given remanent condition. In this respect, it is useful to further provide each core of the matrix with a reset winding 14 as shown in FIG. 9. Reset windings 14 is supplied at the same time interval after each routing operation with a predetermined reset current acting on the cores in a direction reverse to that of current $I_0$.

During such resetting actions, however, stray or transient currents are induced in the branches of the switch, and such currents may become excessive due to the substantial short-circuits existing on the windings 7 of cores which have not switched magnetic conditions. This drawback is overcome by inserting diodes 15 in the routing channels of the switch to oppose the passage of currents in a direction opposite those routed by the switch during such reset periods of the circuit.

Such a provision cannot be readily made when the current pulses $I_0$ routed to the load include excursions of opposite polarities. This, for instance, is the case when the loads are magnetic storage cores, wherein reading occurs by cancelling the "one" condition of the cores, and the information is restored by a pulse of opposite polarity in a succeeding writing cycle. At other times, new information must be introduced in a core, and prior to storage the previous information must be erased. Consequently, in most cases the input current $I_0$ must meet the following conditions. It must first present a polarity to bring a selected core from a magnetic condition, say P, denoting the binary digit "one," to a magnetic condition N denoting the binary digit "zero"; secondly, it must alternate to the opposite polarity to return the core to P when the new digital value is "one."

Figure 11:
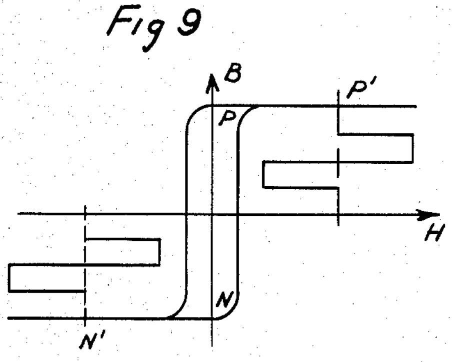
FIGS. 11 and 12 represent graphs explaining the operation of the circuit of FIG. 10.
Figure 12:
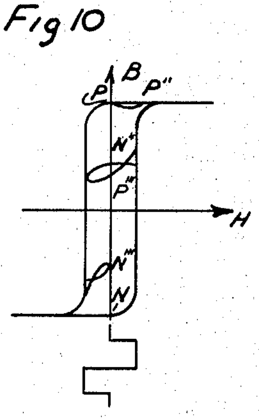

According to an embodiment of the invention shown in FIG. 10, the operation of which will be explained with reference to the graphs of FIGS. 11 and 12, the switch may be utilized to enable the routing of two-polarity currents comprising alternate excursions of opposite polarities. In this case, diodes 15 may be omitted because resetting introduces currents which compensate for the effects of each other in the circuit.

Figure 10:
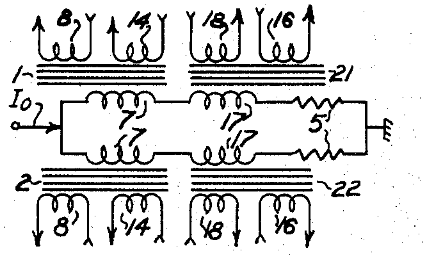
FIG. 10 illustrates a circuit having a purpose similar to that of FIG. 9, but permitting the passage of two-polarity signals to the loads.

In FIG. 10, a two-way switch is shown, but the arrangement may comprise any number of channels and any number of elementary switches per channel. In the diagram shown, one of the channels consists of the serial connection of windings 7 and 17 on cores 1 and 21, respectively. The other channel is similarly made up of identical windings on cores 2 and 22. Cores 1 and 2 are each provided with a reset winding 14 which resets them, for example, to the N magnetic condition. Cores 21 and 22 are each provided with a reset winding 16 for resetting them to the opposite or P magnetic condition. Selection control windings 8 on cores 1 and 2 are operative to saturate these cores at N′, while selection control windings 18 of cores 21 and 22 are operative to saturate cores 21 and 22, when selected, at P′, and thereafter maintain that state during a routing cycle of operation. Thus, when a channel is selected, one of its cores is at N′ and the other at P′, FIG. 11. An input current pulse of $I_0$, regardless of its direction, will be transmitted through this channel without any substantial attenuation.

In the unselected channel, two successive operations occur, as explained with reference to the graph of FIG. 12. For the positive excursion of $I_0$, the core which was at N is brought to N″, while the core which was at P, is brought to P″ and then back to P. For the negative excursion of $I_0$, the first core is brought to N‴ and the second to P‴. The reset will return them to N and P, respectively. Since this resetting acts on such cores and on the selected cores in reverse directions, the induced currents are grouped in two equal pairs which oppose each other, and consequently no series diodes are required in the routing channels.

The selection and reset controls are simple in that for each branch, the windings 14 and 16 on the one hand, and the windings 8 and 18 on the other hand may be connected in a subtractive series relationship, whereby the same current will act on the selected cores.

Figure 13:
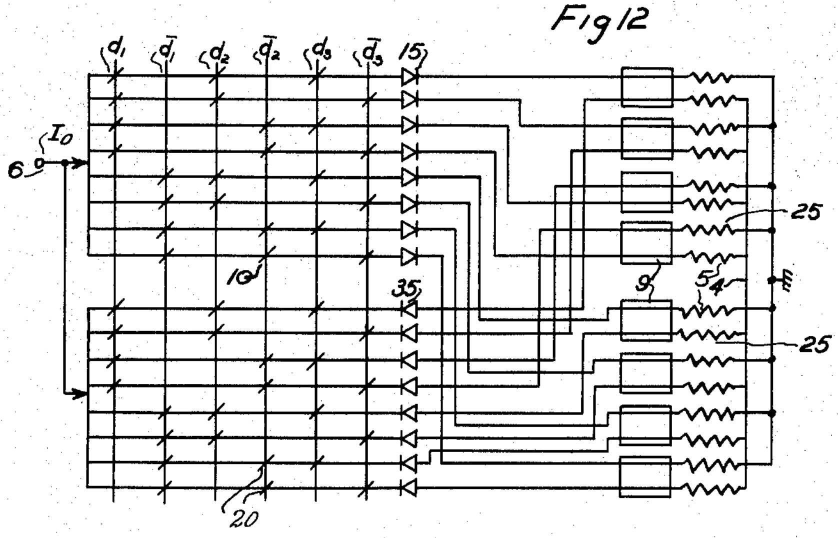
FIG. 13 shows the manner in which the circuit of FIG. 9 may be used in a switching circuit of the type disclosed in FIG. 6 when two-polarity signals are to be supplied to the loads.
Figure 14:
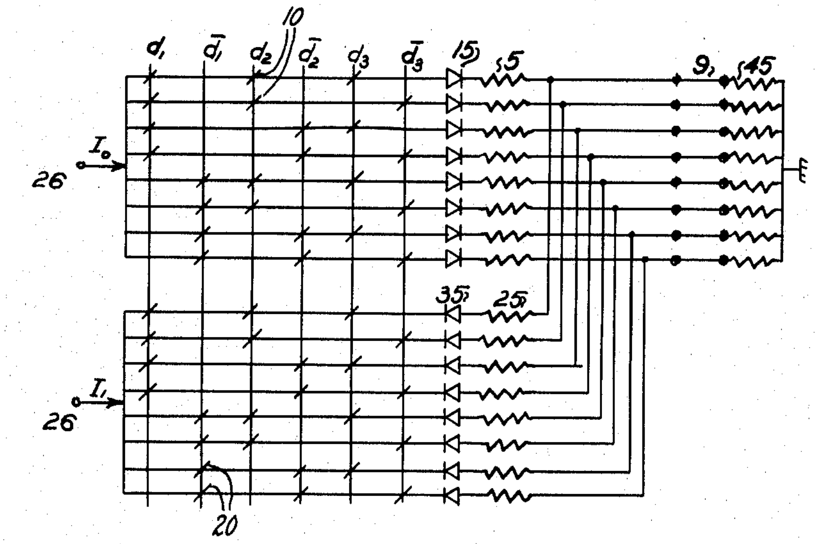
FIG. 14 shows a circuit arrangement which may be substituted for the arrangement of FIG. 13.

For the routing of alternating currents, it may be preferred, instead of a series duplication of magnetic cores, to duplicate the switch matrix, as exemplified in the arrangement shown in FIGS. 13 and 14. In these figures, the basic switch of FIG. 9 is employed with the reset windings omitted for the sake of clarity. The device includes two identical matrices of cores 10 and 20, the selection control windings reversing from one matrix to the other. For instance, when the selected cores 10 are brought to their N′ conditions, the correspondingly selected cores 20 are brought to their P′ conditions. The unselected cores 10 remain at N and the unselected cores 20 remain at P, i.e. the respective reset conditions for these cores. Two lines are selected simultaneously. Each line of the matrix of cores 10 is provided with a diode 15, poled, for example, to pass a positive excursion of $I_0$. Each line of the matrix of cores 20 is provided with a series diode 35 passing any negative excursions of $I_0$. Series resistances are shown at 5 and 25, and the pairs of lines as above-defined remain separate throughout the loads 9 which may be, for example, the lines of a storage matrix of magnetic cores.

Figure 15:
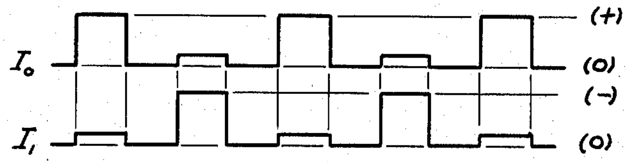
FIG. 15 shows signal wave forms for use in the arrangement of FIG. 14.

FIG. 14 illustrates an embodiment of the invention similar to FIG. 13 and also employing the basic switch unit of FIG. 9. In this case, the loads are preferably connected to common output points of the routing channels by pairs of lines derived from cores 10 and 20. Currents $I_0$ and $I_1$, to be routed, are separate and applied to terminals 6 and 26, respectively. These currents are of wave forms of complementary amplitude changes, i.e. when the amplitude of one waveform is at its higher value the other waveform is at a lower value, and vice-versa (FIG. 15). When seen from the magnetic cores one of the currents varies from zero to a positive amplitude and the other from zero to a negative amplitude. Obviously, they may actually be of identical polarity but applied to oppositely wound windings on the cores. Each line is terminated by a separate resistor 45.

The signal-to-noise ratio in each channel of an arrangement such as shown in FIG. 14 is very good since each time a signal is routed on a selected channel, the limited current through the other channel of the pair may be used to compensate for the noise by suitable calibration of its amplitude. When there are not $2^{n-1}$ cores per column, the noise does not exist on all the lines of the switch matrix, and is compensated for by the noise on the lines where it actually exists with such a circuit arrangement.

In other arrangements, the signal-to-noise ratio may be so low that special precautions are necessary to compensate for the noise. This may be accomplished with the circuit shown in FIG. 16, identical to FIG. 9, but including an additional winding 34 on each core. All of these additional windings 34 are connected in an additional series channel between input terminal 6 and ground, the channel including a diode 65, of the same polarity as diode 15 and a terminating resistor 55 of suitable dimension. Each of the windings 34 has a number of turns which is lower than the number of turns of any winding 7 of the switch. When one of the cores in any channel changes its condition, the magnetization current therefrom will completely pass into windings 34, and consequently all of the noise will flow in the additional channel to ground through the serially connected windings. When the number of cores is high, the windings 34 may be distributed between several additional channels from terminal 6 to ground, in order to avoid reducing their efficiency due to the excessive inductance value of a single additional channel.

Figures 17, 18, 19, 20, 21, 22, 23:
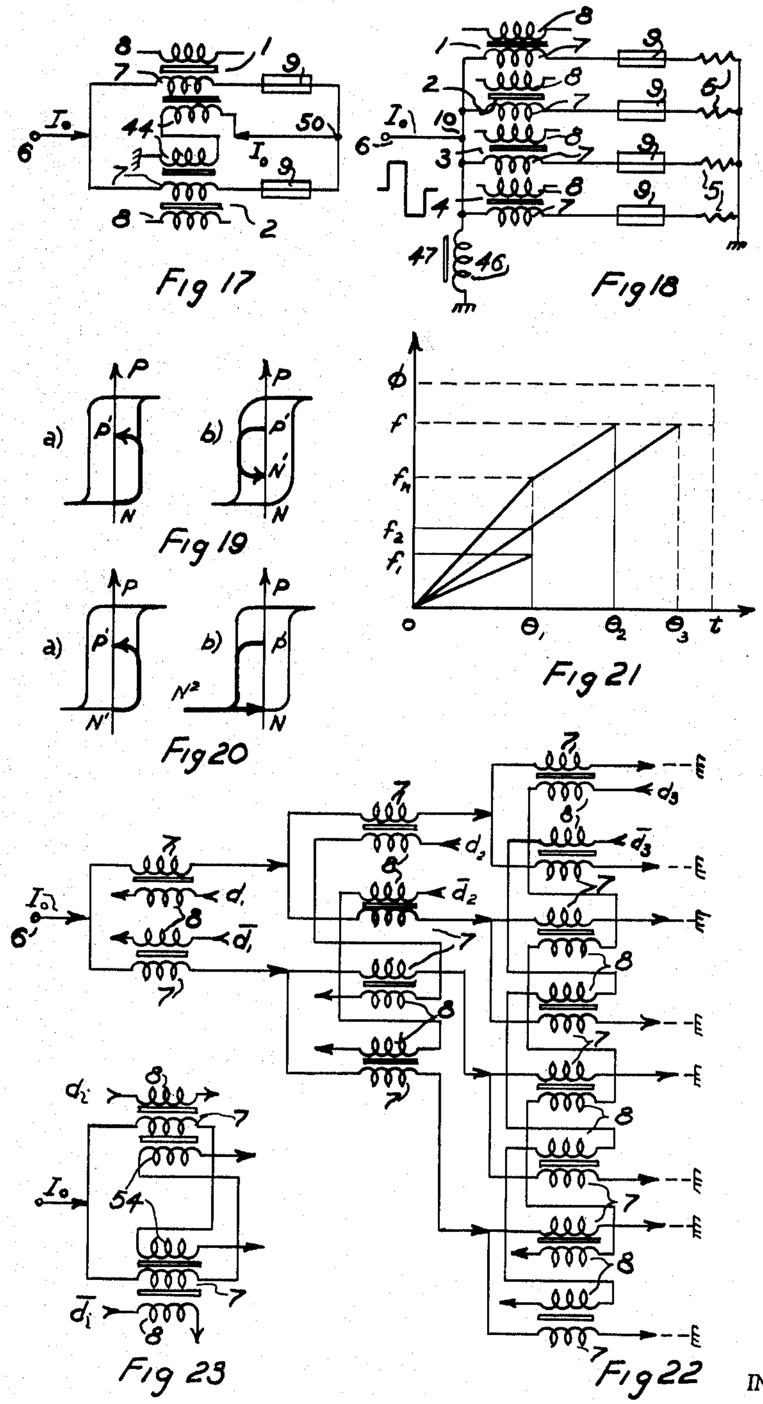
FIG. 17 shows another circuit arrangement similar to FIG. 16, and including a further feature of the invention.
FIG. 18 illustrates a further improvement in the operation of a circuit arrangement according to the invention.
FIGS. 19 to 21 represent graphs explaining the purpose and effect of the improvement illustrated in FIG. 18.
FIG. 22 shows a further embodiment of the invention representing an alternative of the embodiment shown in FIG. 6.
FIG. 23 discloses a way of obtaining a noise compensation in circuits such as shown in FIG. 22.

A second embodiment capable of reducing and even cancelling noise voltages is shown in FIG. 17. FIG. 17 may be employed with the embodiments of FIGS. 9 or 10, but, for the sake of clarity, only a single core is shown in each channel with the reset windings omitted. In this embodiment, each magnetic core includes an additional winding 44 serially connected between a common output point of the loads, shown at 50 and ground. If:

$I_1$ is the current transmitted through the selected core, $I_2$ is the current transmitted through the other channels, M is the number of such channels, and Since the current flowing through windings 44 is $I_0$ (the current applied at 6), then (i) $$I_0=I_1+(M-1)\cdot I_2$$

the coercive current $i_c$ is determined by the relation:

(ii) $$p\cdot I_2+q\cdot(I_1+(M-1)\cdot I_2)=i_c$$

or (iii) $$I_2=\frac{i_c-q\cdot I_1}{p+q\cdot(M-1)}$$

wherein: $p$ denotes the number of turns of the windings 7 and $q$ the number of turns of the windings 44.

When $q$ is made such that (iv) $$i_c=q.I_1$$

any stray current $I_2$ is cancelled. The useful current value in the selected channel is equal to $I_0$.

When $q$ is chosen so that (v) $$i_c<q.I_1$$

the current $I_2$ is of a sign opposite to that of the useful current $I_1$. $I_2$ will be of lower value for a higher number (M) of channels.

Instead of cancelling the stray current, advantage may be taken of its presence to increase the actual value of the useful current $I_1$ with respect to $I_0$. Relation (*i*) must be satisfied. Each unsaturated core will act as a transformer and the sum of their secondary currents will loop through the saturated core of the switch, giving the useful current a value approaching $(p)i_c/q$. In such a case, however, the voltage applied to the input terminal 6 must be suitably increased with respect to its previous value. It may further be useful to dampen all the inductances of the windings 7, which may be achieved in a usual way by shunting these windings by appropriate resistors. In this manner, the current waveforms through the transformers will not be distorted.

Figure 16:
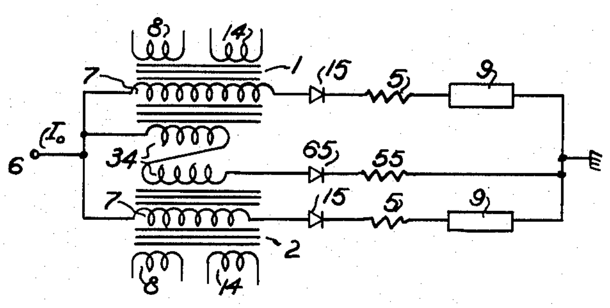
FIG. 16 shows a circuit arrangement according to FIG. 9, including means for improving the signal-to-noise ratio in its operation.

The arrangements of FIGS. 16 and 17 may be used either with a single excursion of current $I_0$ or with two opposite excursions of $I_0$, since in the latter case, it is possible to duplicate the switching matrix as described above with reference to FIGS. 13 and 14.

The circuit diagram of FIG. 18 relates to a separate embodiment of the invention for reducing certain undesirable parasitic currents as explained below. The illustrated switch includes four channels comprising respective magnetic cores 1, 2, 3 and 4, each of which is provided with a winding 7 and a control winding 8. Each line of load 9 of a magnetic core storage matrix is coupled to ground through a resistor 5. Since any one of the loads 9 comprises at least one saturable magnetic core, it is apparent that any one of these cores presents an actual impedance to the current only when in a routing operation, during which it changes from one point of saturation to the other. As soon as a core is saturated, its impedance in the channel concerned is practically zero. The impedance value seen by the current during a reading cycle differs from that seen by the current for a writing cycle (for instance a digit "one" is erased in the reading cycle of operation and a "zero" is written during the following writing cycle of operation, or vice versa).

The change-over of one or several cores (as the case may be) takes a time interval of $\theta_1$ which is lower than the time interval $t$ occupied by one excursion of the current $I_0$. As a whole, the cores of the switch together absorb a magnetic flux equal to the integral over the time interval $t$ of the product of the current $I_0$ and the overall resistance R of the switch and store assembly, plus a magnetic flux equal to the integral during the time interval $\theta_1$ of the product of that current and the impedance Z of the storage cores which change their magnetic states during the cycle of operation concerned. This is true for each one of the excursions of $I_0$. The flux $\phi_1$ is absorbed during a reading cycle and flux $\phi_2$ absorbed during a writing cycle may be of different values. The following two cases may occur.

First, the magnetic flux $\phi_1$ is higher than the magnetic flux $\phi_2$. During a positive excursion of I, each core is brought from N to P′, for example, as shown in FIG. 19*a*. During the following negative alternation of $I_0$, FIG. 19*b*, the same core is brought from P′ to N′ and not back to N. When such an operation is repeated under the same conditions, each unselected core will start from N′, and this point N′ will each time come nearer to P so that finally the switch may be blocked if $\phi_1$ remains higher than $\phi_2$ for a sufficient number of consecutive operations of the switch.

In the second case, $\phi_1$ is lower than $\phi_2$, FIGS. 20*a* and 20*b*. In this case, each unselected core is brought to P′ during each reading cycle of operation and is brought back to $N^2$, before returning to the N condition, so that a significant peak of current occurs as a parasitic current in the switch and its loads for each of such cores.

In order to cancel such drawbacks and prejudicial effects, a branch is connected across the common input terminal 6 and the ground, and a serial winding 46 of an additional saturable magnetic core 47 inserted therein (FIG. 18). The maximum flux which core 47 can absorb is lower than the maximum magnetic flux which the remainder of the arrangement can absorb during either of the excursions of $I_0$, when either no impedance exists at any time of a cycle of operation, or when a maximum impedance exists during one of the excursions.

FIG. 21 shows a graph wherein $\phi$ is the value of the maximum flux which may be absorbed by the cores of the routing switch and $f$ is the flux which may be absorbed by the core 47 before its complete saturation. This is the value to which the finally absorbed flux will be limited according to the arrangement shown in FIG. 20.

When during a period of time $\theta_1$, one magnetic core changes its magnetic condition, it creates an impedance Z and the contribution of this impedance to the total absorbed magnetic flux is $f_1$. When no core of the store is actuated, this flux portion does not exist. During the same time interval $\theta_1$, the flux component absorbed by the overall resistance R of the system reaches a level $f_2$.

In the first case, at the end of $\theta_1$, the absorbed flux is $(f_1+f_2)$; in the second case, this value is $f_2$. From time $\theta_1$, the absorbed flux only increases according to the overall resistance of the system to reach the level $f$ at a time instant $\theta_2$, in the first case, or $\theta_3$ in the second case. As soon as this level is reached, additional core 47 acts by its winding 46 as a substantially complete short circuit, coupling to ground the input current from terminal 6. No more current flows through the routing switch, and in the store all stray effects are inhibited as $f$ is lower than the maximum flux which it can absorb, together with the switch. This will always be true, provided that the time interval of each one of the alternations of $I_0$ is always higher than $\theta_3$, and that the source of current $I_0$ presents some impedance to the terminal 6.

While a routing switch according to the invention may be made as a decoder matrix of magnetic cores of rectangular structure, it may also be made, as shown in FIG. 22, as a "tree" type decoder arrangement. The first "stage" comprises a pair of cores, the output windings 7 of which are connected at one end to input terminal 6, and at the other ends to respective pairs of output windings 7 of the magnetic cores of the next successive stage, and so forth. Control windings 8 receive the digital currents $d_1$ and $\overline{d}_1$ for the selection of the routing channel in the first stage; control windings 8 of the two pairs of cores of the second stage are suitably paired for receiving the control digital currents $d_2$ and $\overline{d}_2$; and so forth. Only $2^{n-1}$ cores are used for $2^n$ addresses instead of $2n$ as in a rectangular matrix arrangement of the switch, but the digital currents cannot be identical since they have to be applied to different numbers of cores in a binary progression from stage to stage of the routing system.

For eliminating the stray currents to improve the signal-to-noise ratio in the switching arrangement of FIG. 22, recourse may be had to the scheme shown in FIG. 23 for each pair of cores in the switch. An additional winding 54 is set on each core of a pair and serially connected with the output winding 7 of the other core of the pair concerned, the free ends of such additional windings 54 being connected to the output windings of a successive pair of cores. The basic switch of FIG. 23 is similar in principle to FIGS. 16 and 17, and, using the notation above relative to FIG. 17, winding 7 having $p$ turns and winding 54 having $q$ turns, $p$ and $q$ may be so provided that:

(vi) $$p.I_2+q.I_1=i_c$$

and consequently (vii) $$I_2=(i_c-q.I_1)/p$$

so that with (viii) $$q=i_cI_1$$

we have (ix) $$I_2=0$$

While specific embodiments of the invention have been shown and described in detail to illustrate the application of the invention principles, it will be understood that the invention may be embodied otherwise without departing from such principles, and the invention should not be limited except as defined in the following claims.

What is claimed is:

1. A device for selectively routing an alternating input current from an input terminal to a selected one of a plurality of loads, said device comprising a plurality of channels coupled to respective ones of said loads, each of said channels including first saturable magnetic core means having output and control windings, said control windings being operable to set said first saturable magnetic core means in a positive magnetic condition, second saturable magnetic core means having output and control windings, said last named control windings being operable to place said second saturable magnetic core means in a negative magnetic condition, the output windings of the saturable magnetic core means of each channel being connected to the load of that channel and said input terminal.

2. A device according to claim 1, wherein said first saturable magnetic core means comprises a matrix of individual saturable magnetic cores and said second saturable magnetic core means comprises a matrix of saturable magnetic cores identical to said first matrix, said control windings being operable to saturate all of the magnetic cores in one column of each matrix, and wherein each of said channels includes a series connection of the output windings of one row of saturable magnetic cores of said first matrix and a series connection of the output windings of one row of saturable magnetic cores of said second matrix.

3. A device according to claim 2, wherein the rows of saturable magnetic core output windings in each channel are connected in parallel to said input terminal and through said load to a source of constant potential.

4. A device according to claim 2, wherein said cores have a rectangular hysteresis loop, and including a diode in each of said series connections, said diodes being poled to block stray currents produced when said cores switch magnetic states.

References Cited by the Examiner

UNITED STATES PATENTS

| | | | |
|---|---|---|---|
| 2,931,017 | 3/1960 | Bonn | 340—174 |
| 2,972,129 | 2/1961 | Bonn | 340—174 |

IRVING L. SRAGOW, *Primary Examiner.*

BERNARD KONICK, *Examiner.*

R. J. McCLOSKEY, *Assistant Examiner.*